US009715614B2

(12) United States Patent
Todeschini et al.

(10) Patent No.: US 9,715,614 B2
(45) Date of Patent: *Jul. 25, 2017

(54) SELECTIVE OUTPUT OF DECODED MESSAGE DATA

(71) Applicant: Hand Held Products, Inc., Fort Mill, SC (US)

(72) Inventors: Erik Todeschini, Camillus, NY (US); Robert Michael Hussey, Waxhaw, NC (US); Taylor Smith, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,006

(22) Filed: Jun. 19, 2015

(65) Prior Publication Data
US 2015/0310247 A1 Oct. 29, 2015

Related U.S. Application Data

(63) Continuation of application No. 13/743,477, filed on Jan. 17, 2013, now Pat. No. 9,064,168.

(60) Provisional application No. 61/737,552, filed on Dec. 14, 2012.

(51) Int. Cl.
G06K 7/10 (2006.01)
G06K 7/14 (2006.01)

(52) U.S. Cl.
CPC ....... G06K 7/1443 (2013.01); G06K 7/10881 (2013.01); G06K 7/1447 (2013.01)

(58) Field of Classification Search
USPC ......... 235/383, 385, 462.01, 472.01–472.03, 235/462.45–462.49
See application file for complete search history.

(56) References Cited

U.S. PATENT DOCUMENTS

| | | | |
|---|---|---|---|
| 6,164,545 A * | 12/2000 | Danielson | G06K 7/10722 235/472.01 |
| 6,731,326 B1 * | 5/2004 | Bettinardi | G06T 3/40 348/345 |
| 7,069,238 B2 | 6/2006 | Anson et al. | |
| 7,719,520 B2 * | 5/2010 | Singh | G06F 3/013 345/169 |
| 8,086,490 B2 | 12/2011 | Zampini, II et al. | |
| 8,106,775 B2 | 1/2012 | Ohkawa et al. | |
| 8,212,833 B2 | 7/2012 | Kargman | |
| 8,224,483 B1 | 7/2012 | Ansari et al. | |
| 8,279,067 B2 | 10/2012 | Berger et al. | |
| 8,290,876 B1 | 10/2012 | Powell | |
| 8,292,807 B2 | 10/2012 | Perkins et al. | |
| 8,301,898 B2 | 10/2012 | Kishi | |
| 8,313,032 B2 | 11/2012 | Fjellstad et al. | |

(Continued)

Primary Examiner — Tuyen K Vo
(74) Attorney, Agent, or Firm — Additon, Higgins & Pendleton, P.A.

(57) ABSTRACT

An imaging apparatus can be operative to capture a frame of image data representing a scene having one or more decodable indicia and display image data corresponding to the one or more decodable indicia. The imaging apparatus can be operative so that responsively to a user input control decoded message data of a selected decodable indicia is selectively output. One or more processor executable program can be provided for facilitating selective output of decoded message data.

19 Claims, 7 Drawing Sheets

(56) References Cited

U.S. PATENT DOCUMENTS

| | | | |
|---|---|---|---|
| 8,395,656 B1 | 3/2013 | Malzbender et al. | |
| 8,576,175 B2* | 11/2013 | Singh | G06F 3/013 345/169 |
| 9,064,168 B2 | 6/2015 | Todeschini et al. | |
| 2005/0279832 A1 | 12/2005 | Kobayashi et al. | |
| 2006/0243806 A1* | 11/2006 | Goodman | G06K 1/12 235/462.13 |
| 2010/0315438 A1* | 12/2010 | Horodezky | G06F 3/0481 345/661 |
| 2012/0012649 A1 | 1/2012 | Hsu | |
| 2012/0019480 A1 | 1/2012 | Cannon | |
| 2012/0023167 A1 | 1/2012 | Hovdal et al. | |
| 2012/0037699 A1 | 2/2012 | Sugita | |
| 2012/0050198 A1 | 3/2012 | Cannon | |
| 2012/0061458 A1 | 3/2012 | Bahr et al. | |
| 2012/0081282 A1 | 4/2012 | Chin | |
| 2012/0084846 A1 | 4/2012 | Weis et al. | |
| 2012/0089467 A1 | 4/2012 | Comparelli | |
| 2012/0089471 A1 | 4/2012 | Comparelli | |
| 2012/0096358 A1 | 4/2012 | Barnes, Jr. | |
| 2012/0105486 A1* | 5/2012 | Lankford | G06F 3/013 345/661 |
| 2012/0109762 A1 | 5/2012 | Getchius | |
| 2012/0118969 A1 | 5/2012 | Zolotov | |
| 2012/0136777 A1 | 5/2012 | Hanson | |
| 2012/0153015 A1 | 6/2012 | Gomez et al. | |
| 2012/0154647 A1* | 6/2012 | Endo | H04N 13/0239 348/262 |
| 2012/0168497 A1 | 7/2012 | Yach | |
| 2012/0173318 A1 | 7/2012 | Lee et al. | |
| 2012/0194320 A1 | 8/2012 | Yeakley et al. | |
| 2012/0206449 A1 | 8/2012 | Stark | |
| 2012/0210268 A1 | 8/2012 | Hilbrink et al. | |
| 2012/0222055 A1 | 8/2012 | Schaefer et al. | |
| 2012/0222081 A1 | 8/2012 | Schaefer et al. | |
| 2012/0261465 A1 | 10/2012 | Vasquez et al. | |
| 2012/0271742 A1 | 10/2012 | Solomon | |
| 2012/0290336 A1 | 11/2012 | Rosenblatt et al. | |
| 2012/0290418 A1 | 11/2012 | Itwaru | |
| 2012/0293406 A1* | 11/2012 | Park | G06F 1/1626 345/156 |
| 2012/0295234 A1 | 11/2012 | Rognon et al. | |
| 2012/0298737 A1 | 11/2012 | Thakar et al. | |
| 2012/0298744 A1 | 11/2012 | Hung et al. | |
| 2012/0299961 A1 | 11/2012 | Ramkumar et al. | |
| 2012/0310827 A1 | 12/2012 | Gibson, III | |
| 2013/0256395 A1* | 10/2013 | Barkan | G06Q 20/00 235/375 |
| 2013/0278635 A1 | 10/2013 | Maggiore | |
| 2013/0304561 A1 | 11/2013 | Warner et al. | |
| 2013/0341401 A1 | 12/2013 | Kannan et al. | |
| 2014/0118249 A1 | 5/2014 | Hildreth | |
| 2015/0039468 A1* | 2/2015 | Spitz | G06Q 30/0613 705/26.41 |

* cited by examiner

SELECTIVE OUTPUT OF DECODED MESSAGE DATA

CROSS REFERENCE TO RELATED APPLICATIONS

This application claims the benefit of U.S. patent application Ser. No. 13/743,477 for Selective Output of Decoded Message Data filed Jan. 17, 2013 (and published Jun. 19, 2014 as U.S. Patent Application Publication No. 2014/0166761), now U.S. Pat. No. 9,064,168, which claims the benefit of U.S. Provisional Application No. 61/737,552 for Selective Output of Decoded Message Data filed Dec. 14, 2012. Each of the foregoing patent applications, patent publication, and patent is hereby incorporated by reference in its entirety.

FIELD OF THE INVENTION

The present invention relates in general to optical systems and specifically to optical systems having selective output of decoded message data.

BACKGROUND

Image sensor integrated circuits having multiple pixel image sensor arrays are commercially available. Imaging apparatus having image sensor arrays are available in a variety of forms, including digital cameras, mobile phones, surveillance equipment, medical diagnostic equipment, and indicia decoding apparatus. Imaging apparatuses are available in forms with indicia decoding capability and without decoding capability. Imaging apparatus with permanent or selectively activated indicia decoding capability can be regarded as indicia reading apparatus.

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available, often in a form where a keyboard and display is commonly located by the providing of a touch screen type display, e.g., as in a mobile phone. Keyboard and display equipped indicia reading apparatus are commonly used in retail, shipping, and warehouse applications. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality. Fixed mount indicia reading apparatus are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

SUMMARY

An imaging apparatus can be operative to capture a frame of image data representing a scene having one or more decodable indicia and display image data corresponding to the one or more decodable indicia. The imaging apparatus can be operative so that responsively to a user input control decoded message data of a selected decodable indicia is selectively output. One or more processor executable program can be provided for facilitating selective output of decoded message data.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
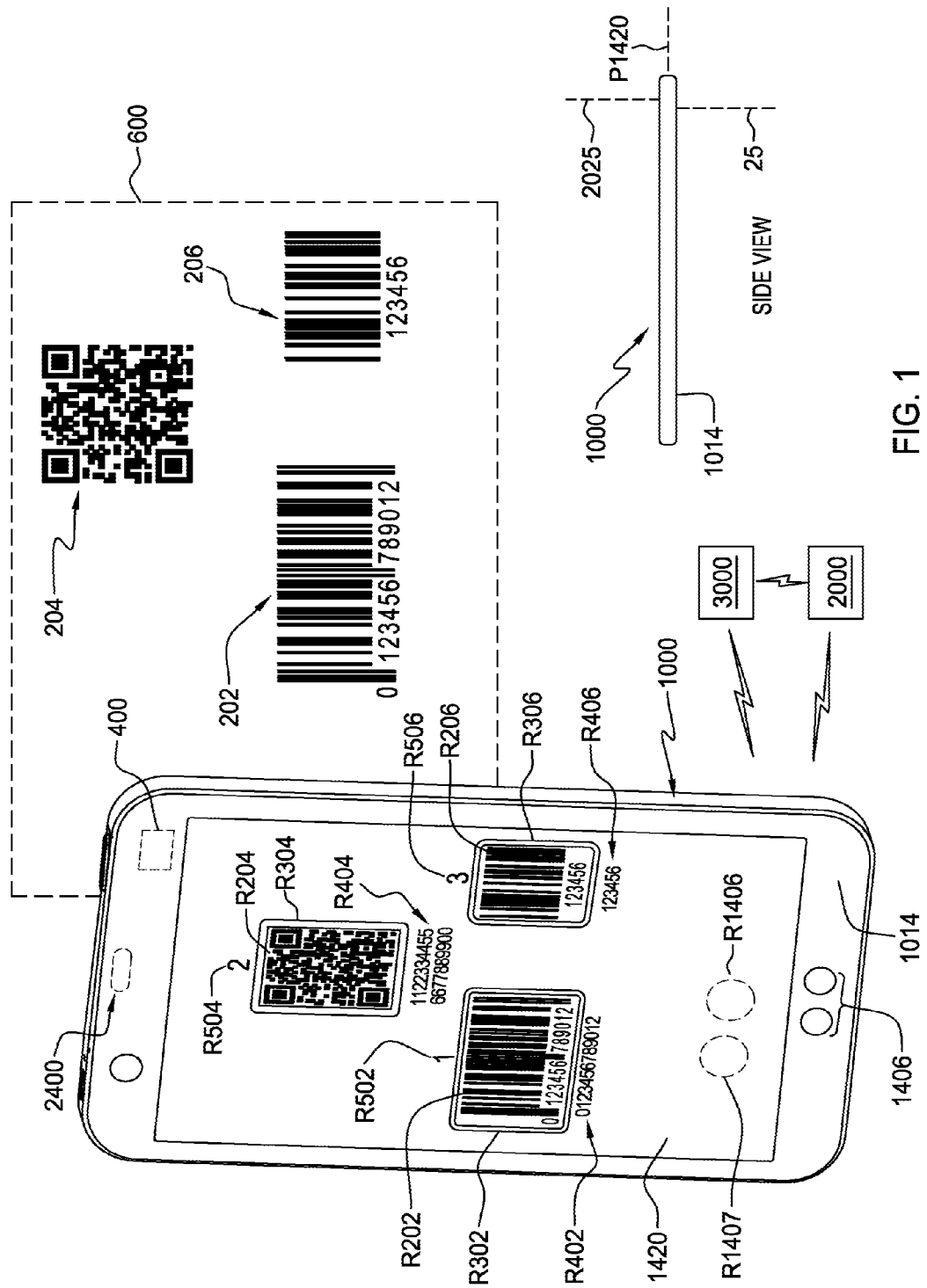
FIG. 1 is a perspective physical form view (with supplemental side view) of an imaging apparatus displaying representations of a plurality of bar codes.

Referring to FIG. 1 an imaging apparatus 1000 can be operative to capture a frame of image data representing a scene having a plurality of decodable indicia and display image data corresponding to the decodable indicia. The imaging apparatus 1000 can be operative so that responsively to a user input control decoded message data of a selected decodable indicia is selectively output. The selective output can be, e.g., to a different functional block of a current program performing the display, and/or a different program, the image apparatus and/or to one or more external processor equipped apparatus for use in one or more program therein.

In the embodiment of FIG. 1, imaging apparatus 1000 can include an imaging assembly 400 for use in capturing a frame of image data representing a scene within a field of view 600 of imaging assembly 400. Because apparatus 1000 includes imaging assembly 400, field of view 600 can also be regarded as a field of view of apparatus 1000. The scene within field of view 600 as indicated in the example of FIG. 1 can include a plurality of decodable indicia, e.g., bar codes 202, 204, 206. Decodable indicia can also include text including OCR characters. In the development of apparatus and methods herein it was determined that without adaptations as are set forth herein an unwanted decoded message data can be output to a designated output destination. For example, referring to the scene of FIG. 1 an operator may wish that a decoded message decoded by processing a representation of bar code 206 be output; however, a decoded message of bar code 204 may instead be inadvertently output, e.g., if apparatus 1000 is programmed to decode and output a center-most decodable indicia. The imaging apparatus 1000 can be operative so that responsively to a user input control decoded message data of a selected decodable indicia, e.g., a selected one or more of decodable indicia provided by bar code 202, bar code 204, and bar code 206 is selectively output. In a further aspect, imaging apparatus 1000 can be operative so that imaging apparatus 1000 is restricted from outputting decoded message data of a certain indicia unless the operator inputs a control to apparatus 1000 to output decoded message data of the certain decodable indicia.

Figure 2:
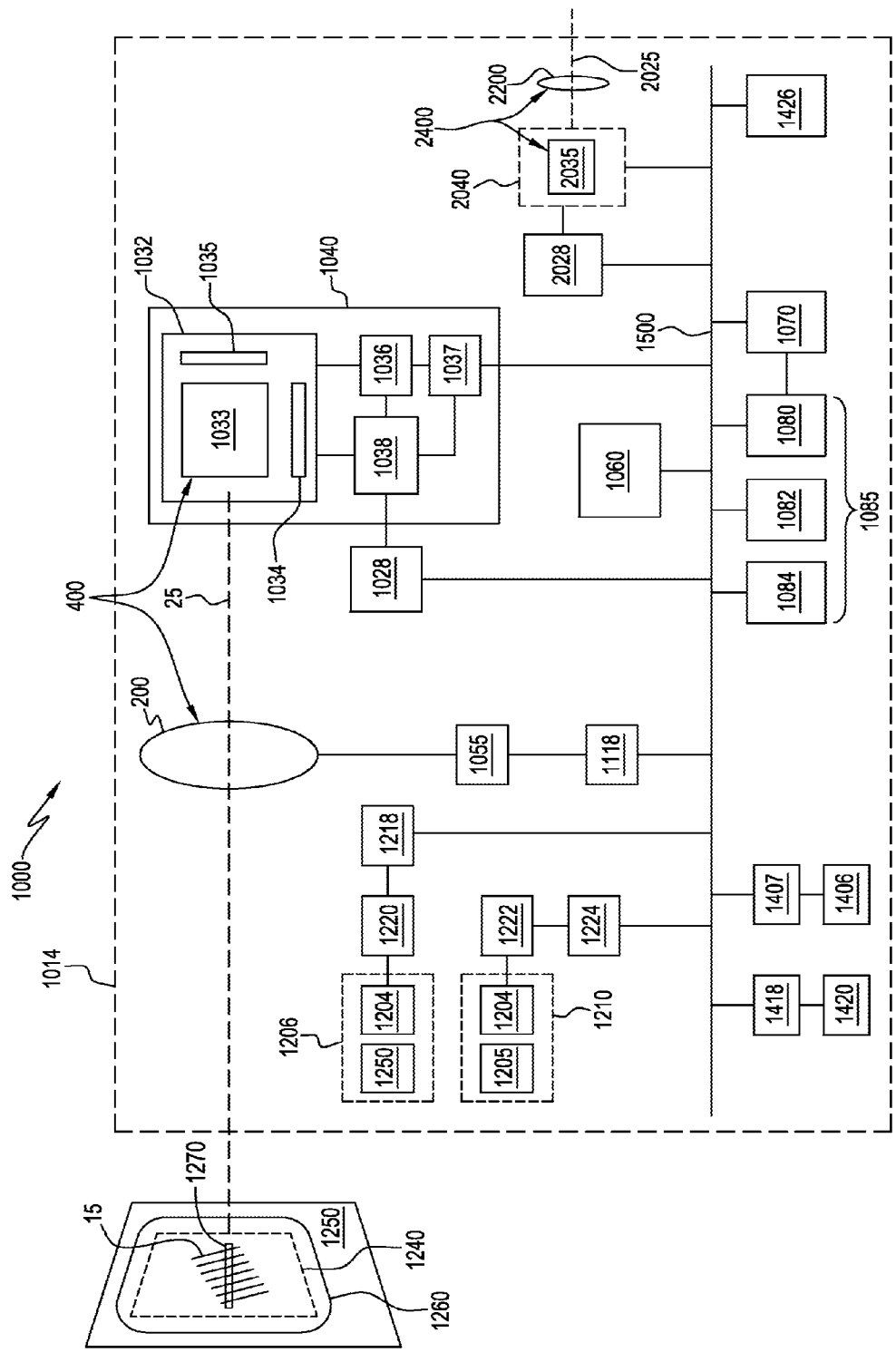
FIG. 2 is a block diagram of an imaging apparatus.

An exemplary hardware platform for apparatus 1000 is set forth in FIG. 2. Imaging apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of apparatus 1000 image signals can be read out of image sensor 1032, converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, lens assembly 200 can be adapted for focusing an image of a decodable indicia 15 located within a field of view 1240 on a substrate 1250 onto image sensor array 1033. Imaging light rays can be transmitted about imaging axis 25. Lens assembly 200, in one embodiment, can be adapted to be capable of multiple focal lengths and multiple best focus distances. An imaging assembly 400 of apparatus 1000 can include lens assembly 200 and image sensor array 1033.

Apparatus 1000 can also include an illumination pattern light source bank 1204 and associated light shaping optics 1205 for generating an illumination pattern 1260 substantially corresponding to a field of view 1240 of apparatus 1000. The combination of bank 1204 and optics 1205 can be regarded as an illumination pattern generator 1206. Apparatus 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, apparatus 1000 can be oriented by an operator with respect to a substrate 1250 bearing decodable indicia 15 in such manner that aiming pattern 1270 is projected on a decodable indicia 15. In the example of FIG. 2, decodable indicia 15 is provided by a 1D bar code symbol. Decodable indicia 15 could also be provided e.g., by a 2D bar code symbol or decodable text such as optical character recognition (OCR) characters. In the example of FIG. 1, decodable indicia 202 is provided by a UPC bar code symbol, decodable indicia 204 is provided by a QR code symbol and decodable indicia 206 is provided by a code 128 symbol. Each of illumination pattern light source bank 1204 and aiming pattern light source bank 1208 can include one or more light sources. Lens assembly 200 can be controlled with use of electrical power input unit 1055 which provides energy for changing a plane of optimal focus of lens assembly 200. In one embodiment, an electrical power input unit 1055 can operate as a controlled voltage source, and in another embodiment, as a controlled current source. Illumination pattern light source bank 1204 can be controlled with use of illumination pattern light source control circuit 1220. Aiming pattern light source bank 1208 can be controlled with use of aiming pattern light source bank control circuit 1222. Electrical power input unit 1055 can apply signals for changing optical characteristics of lens assembly 200, e.g., for changing a focal length and/or a best focus distance of (a plane of optimum focus of) lens assembly 200. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a lumen of illumination output by aiming pattern light source bank 1208. In one embodiment, imaging apparatus 1000 can be devoid of elements that project an illumination pattern.

Apparatus 1000 can also include a number of peripheral devices including trigger R1408 which may be used to make active a trigger signal for activating frame readout and capture and/or certain decoding processes and/or other processes. Apparatus 1000 can be adapted so that manual actuation of trigger R1406 activates a trigger signal and initiates a decode attempt. In the embodiment of FIG. 1, trigger R1408 is provided by a virtual trigger that is displayed on display 1420. A hardware actuator e.g., of keyboard 1406 can also be configured as a trigger. Apparatus 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. In one embodiment, CPU 1060 can run one or more program 1800 as set forth herein when decoding decodable indicia. In some embodiments, as set forth herein, a trigger signal can be made active by entering a selective decoded message data output mode in which apparatus 1000 can selectively output candidate decoded message data responsively to an operator input control to select for output decoded message data of a certain decodable indicia. In such an operating mode in one embodiment, apparatus 1000 can be operative to continually attempt to decode frames of a succession of frames and responsively to an operator input control can output decoded message data of a subset e.g., one, frames successfully decoded during operation in the mode.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1118 for coupling electrical power input unit 1055 to system bus 1500, interface circuit 1218 for coupling illumination light source bank control circuit 1220 to system bus 1500, interface circuit 1224 for coupling aiming light source bank control circuit 1222 to system bus 1500, and interface circuit 1404 for coupling keyboard 1406 to system bus 1500. Apparatus 1000 can also include a display 1420 coupled to system bus 1500 and in communication with CPU 1060, via interface 1418. In another aspect apparatus 1000 can include a network communication interface 1426 couple to system bus 1500. Network communication interface 1426 can be e.g., one or more of an IEEE 802.11 interface a Bluetooth interface or a cellular radio interface. In one embodiment server 2000, server 3000 can include CPU 1060 memory 1085 bus 1500 and communication interface 1426 components corresponding to those described in connection with apparatus 1000. In one embodiment, apparatus 1000, server 2000, and server 3000 can be in communication with one another via, e.g., the TCP/UDP or TCP/IP suite of network communication protocols. Display 1420 in one embodiment can be a touch screen display having a touch panel associated to display apparatus.

A succession of frames of image data that can be captured and subject to the described processing can be full frames (including pixel values corresponding to the maximum number of pixels subject to readout during a course of operation of apparatus 1000). In one example a maximum number of pixels is each pixel of image sensor array 1033. A succession of frames of image data that can be captured and subject to the described processing can also be "windowed frames" comprising pixel values corresponding to less than a maximum number of pixels subject to readout during a course of operation of apparatus 1000. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

In another aspect, apparatus 1000 can include a second image sensor integrated circuit 2040 disposed in combination with a second imaging lens assembly 2200 for capture of image data in the manner set forth in reference to image sensor integrated circuit 1040. Image sensor integrated circuit 2040 can include an image sensor array 2033 and the remaining elements set forth with reference to image sensor integrated circuit 1040. A second imaging assembly 2400 of apparatus 1000 can include an image sensor assembly 2033 and lens assembly 2200. Image sensor integrated circuit 2040 can be in communication with system bus 1500 via interface 2028. Image sensor integrated circuit 2040 can be aperture for use in capturing frames of image data in the manner of image sensor integrated circuit 1040. Received light rays received by imaging assembly 400 can be received about imaging axis 25. Received light rays received by imaging assembly 2400 can be received by imaging axis 2025. Imaging axis 25 can extend downwardly from apparatus 1000. Imaging axis 2025 can extend upwardly from apparatus 1000. Indicated by the side view reference view of FIG. 1 imaging axis 25 can extend vertically downward and can be perpendicular relative to a display plane P420 on which display 1420 extends. Imaging axis 2025 can extend vertically downward and can be perpendicular relative to display plane P1420 on which display 1420 extends. Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

Further regarding apparatus 1000, an electrical power input applied by electrical power input unit 1055 for establishing a desired lens setting of lens assembly 200 can be responsive, e.g., to a sensed condition or an operator input command.

A physical form view of apparatus 1000 in one embodiment is shown in FIG. 1. Display 1420 and keyboard 1406 can be disposed on a common side of a hand held housing 1014 as shown in FIG. 1. Display 1420 and keyboard 1406 in combination can be regarded as a user interface of apparatus 1000. Display 1420 can be a touch screen display in one embodiment. A user interface of apparatus 1000 can also be provided by configuring apparatus 1000 to be operative to be reprogrammed by decoding of programming bar code symbols. Apparatus 1000 can include a hand held housing 1014 that supports imaging assembly 400 and imaging assembly 2400 that can be disposed in (e.g., entirely or partially) in hand held housing 1014.

Figure 3:
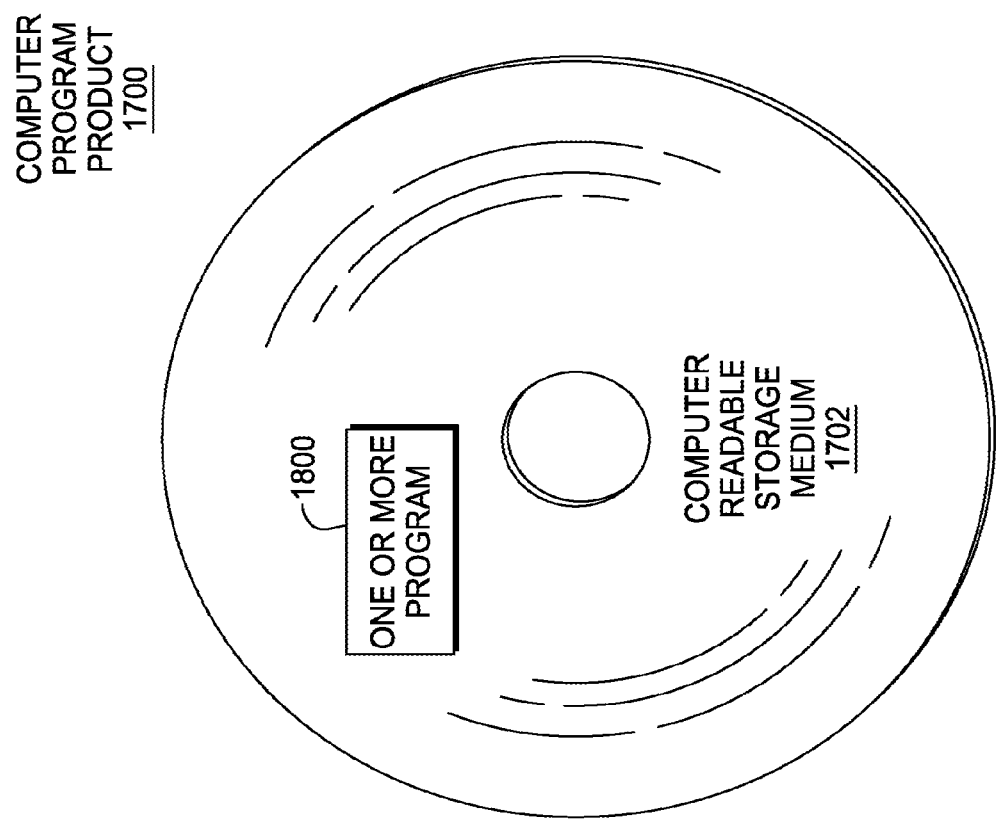
FIG. 3 is a computer readable storage medium storing one or more program.

As set forth in FIG. 3 there can be provided a computer program product 1700 comprising a computer readable storage medium 1702 storing one or more program 1800, the one or more program 1800 comprising program code logic for facilitating selective decoded message data. One or more program 1800 can include computer executable instructions executable by a processor e.g., CPU 1060 of apparatus 1000.

Figure 4:
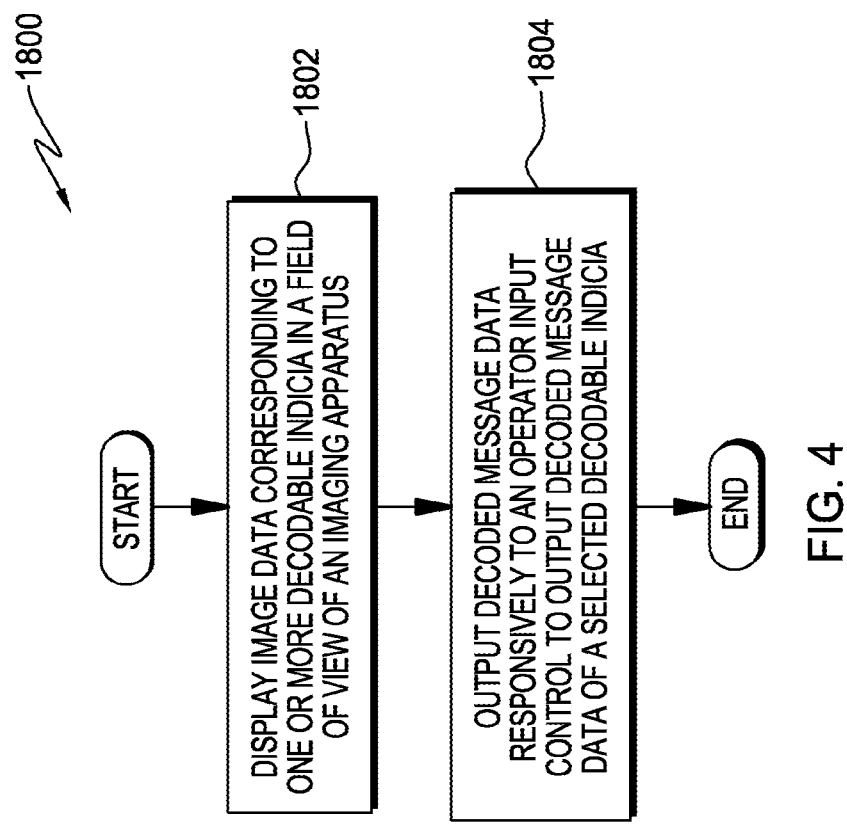
FIG. 4 is a flow diagram illustrating functions of one or more program that can be stored on a computer readable medium.

In one embodiment, CPU 1060 of apparatus 1000 can be operative to run the computer executable one or more program 1800 having the functions that are indicated in the flow diagram of FIG. 4. At block 1802 one or more program 1800 can display image data corresponding to a plurality of decodable indicia in a field of view of apparatus 1000 e.g., a field of view 600 as set forth in FIG. 1. At block 1804 one or more program 1800 can output to an output destination decoded message data responsively to an operator input control to output decoded message data of a selected decodable indicia.

In the performance of block 1802 in one embodiment one or more program 1800 in the performance of block 1802 (display image data corresponding to one or more decodable indicia) can send for display on display 1420 image data of a frame of image data captured by imaging apparatus 1000. In the specific example of FIG. 1 displayed image data displayed on display 1420 can include representations R202, R204, R206 of decodable indicia e.g., decodable indicia 204, 204, 206 shown as being provided by bar code symbols within field of view 600. The frame of image data can be a contemporaneously captured frame captured using apparatus 1000. In one embodiment the image data that is displayed can be formatted by highlighting representations of decodable indicia that can be decoded using currently captured image data. One or more program 1800 for determining whether decodable indicia can be decoded using currently captured image data can attempt to decode the decodable indicia using currently captured image data, e.g., currently stored e.g., buffered image data for processing, e.g., as may be buffered in RAM 1080. One or more program 1800 can determine that a decodable indicia is decodable by successfully decoding the indicia. In another embodiment one or more program 1800 can determine that a decodable indicia is decodable by successfully locating the decodable indicia in a currently captured frame of image data. In one embodiment, a displayed highlight that highlights a representation of a decodable indicia can be a border, e.g., border R302, R304, R306. In another embodiment of a highlighting, a displayed representation of decodable indicia that is determined to be decodable using currently captured image data is displayed using a selective flashing display (image data representing a scene can be displayed with only areas representing decodable indicia displayed in a flashing display). In another example a highlighting can include decoded messages R402, R404, R406 of a decodable indicia being represented by displayed image data. While various highlighting schemes are possible, it will be understood that no highlighting is necessary. In one embodiment, one or more program 1800 provisions apparatus 1000 so that an operator can select a certain decodable indicia without any highlighting of the decodable indicia (e.g., mere display of a representation of the decodable indicia without any highlighting). In a further aspect there is set forth herein a method comprising displaying, using a processor, image data corresponding to one or more decodable indicia in a field of view of an imaging apparatus, and outputting, using the processor, decoded message data of a selected decoded indicia responsively to an operator input control to output decoded message data of a selected decodable indicia of the one or more decodable indicia, wherein an operator input control to output decoded message data of a selected decodable indicia comprises a touching of a location of a display that displays a representation of the selected decodable indicia selected by the touching. Another selection method set forth herein can be used in place of or in addition to the touching. In accordance with one or more program 1800, the decoded message data of the selected decodable indicia can be determined, e.g., prior to or after the time of a selection of the selected decodable indicia.

In one embodiment, there is set forth herein a method comprising displaying, using a processor, image data corresponding to one or more decodable indicia in a field of view of an imaging apparatus, wherein the one or more decodable indicia has been subject to decoding processing at a time of the displaying, and outputting, using the processor, decoded message data of a selected decoded indicia responsively to an operator input control to output decoded message data of a selected decodable indicia of the one or more decodable indicia. In one embodiment the decoding processing comprises attempting to decode. In one embodiment the decoding processing includes completing decoding by determining a decoded message. In one embodiment, the decoding processing comprises determining a location of a decodable indicia (typically a first step in a decode attempt). By determining a location of a decodable indicia with no further decoding processing steps prior to display of image data of frame on display 1420, one or more program 1800 is able to monitor an output of display interface 1418 of display 1420 (where provided by a touch screen display) to determine whether an area of a display corresponding to a location of a displayed decodable indicia representation has been touched.

In the performance of block 1804 one or more program 1800 can selectively output decoded message data responsively to a use input control to selectively output decoded message data. The selective output can be to an output destination. In one embodiment the output destination can be a different function block of one or more program 1800 running on CPU 1060. In one embodiment the output destination can be to a program running on CPU 1060 other than one or more program 1800. In one example the output destination can be an external processor equipped apparatus, e.g., server 2000 or server 3000 for use by one or more program running thereon. In the performance of block 1804, where the output destination is an external processor equipped apparatus, CPU 1060 can communicate with a network communication interface 1426. A communication between apparatus 1000 and server 2000 or server 3000 can employ a suitable protocol running over the TCP/UDP transport layer, e.g., HTTP or XML.

In the performance of block 1804 for providing the function of determining an operator selection has occurred, one or more program 1800 can monitor for an occurrence of an operator input control to transmit decoded message data of a selected decodable indicia. As will be set forth further herein, monitoring of which one or more program 1800 can detect for can include, e.g., tactile monitoring (e.g., a touching of display 1420 where provided by a touch screen), acoustical monitoring, (e.g., where an operator inputs a voice command), an image based monitoring, (e.g., one or more program 1800 determines where an operator is looking based on processing of image data captured using an imaging assembly).

In one embodiment at block 1802 one or more program 1800 processes a single frame of image data, e.g., to display image data of the frame on display 1420, to attempt to decode the frame of image data, to determine whether the frame of image data is decodable using currently captured image data, to highlight representations of decodable indicia determined to be decodable using currently captured image data. In such embodiment, one or more program 1800 can display a still frame in the performance of block 1802.

In one embodiment, one or more program 1800 at block 1802 processes a plurality of frames of image data, e.g., to display image data of frames of a succession of frames of image data on display 1420 (a rendering of a motion image), to attempt to decode frames of a succession of frames of image data, to determine whether frames of a succession of frames of image data are decodable using currently captured image data, to highlight representations of decodable indicia in frames of a succession of frames determined to be decodable using currently captured image data.

In an example of one or more program 1800 at block 1802 processing a plurality of frames of image data, one or more program 1800 can obtain frames of a sequence of frames output by a camera library running on CPU 1060. In one embodiment a program of one or more program can control image sensor integrated circuit 1040 for image capture as set forth herein. One or more program 1800 can attempt to decode each incoming frame with a timeout (quits the decoding if decoding is not complete within a specified time). If one or more program 1800 successfully decodes a decodable indicia (or otherwise determines it to be decodable using currently captured image data), one or more program 1800 can highlight the representation of the decodable indicia in the frame image data. When one or more program 1800 decodes a decodable indicia it can determine coordinates of the decodable indicia representations and associate that coordinate data to a decoded message. One or more program 1800 can provide highlights to a decodable indicia representation by appropriately changing values of pixels in locations proximate the decodable indicia representation. If one or more program 1800 is not successful in decoding a frame of image data of a succession of frames, it may nevertheless send image data of the frame to display 1420. A succession of displayed frames will appear to have highlights that track a location of a decodable indicia representation over a succession of frames provided a suitable percentage of the frames have decodable indicia representations that are highlighted. Also, in some instances one or more program 1800 can display a prior frame on display 1420 with highlighted decodable indicia representations after it has decoded it after it has displayed a subsequent frame. Such "out of sequence" display however is unlikely to be perceived by an operator if decoding and highlighting is performed quickly enough.

In one embodiment functionalities set forth herein in connection with the flow diagram of FIG. 4 can be made active on activation of a selective decodable message data output mode. In such an operating mode in one embodiment, apparatus 1000 can be operative to continually attempt to decode frames of a succession of frames and responsively to an operator input control can output decoded message data of a subset (e.g., one, a select few) of decodable indicia represented frames successfully decoded during operation in the mode. A selective decodable message data output mode allows an operator to select (filter) which decoded message data out of a plurality of candidate decoded message data should be output to an output destination.

In one embodiment, a selective decodable message data output mode can be made active by actuation of virtual mode button R1407 or virtual trigger button R1406 (in one specific embodiment the selective decodable message data output mode is provided as a special configuration wherein the mode is activated rather than standard decoding when trigger button R1406 is activated). In one embodiment of the selective decodable message data output mode, activation of the mode results in one or more program 1800 at block 1802 displaying image data of frames of a succession of frames (a motion image) on display 1420 with highlighting of decodable indicia representation of decodable indicia that can be decoded using currently captured image data. Responsively to an operator input control to select a decodable indicia, one or more program can selectively output decoded message data of the decodable indicia. Virtual actuators R1406 and R1407 are shown in dashed view in FIG. 1 since one or more program 1800 can be operative so that virtual actuators R1406 and R1407 are not displayed at a same time the remaining shown as displayed elements set forth in FIG. 1.

In the specific use case illustrated with reference to FIG. 1 it is shown that apparatus 1000 can be used to facilitate selection of decodable message data of, for example one out of a plurality of decodable indicia, each of the plurality of decodable indicia 202, 204, 206 having a corresponding displayed representation R202, R204, R206. However, in an important aspect apparatus 1000 in accordance with the functions of one or program 1800 set forth in FIG. 4 need not be used to allow selection of one or more out of a plurality of decodable indicia, but rather may be used to select (or not select) decoded message data of a single decodable indicia for selective output. As set forth herein one or more program 1800 can be operative so that apparatus 1000 is restricted from outputting to a designated output destination decoded message data unless the decoded message data is of an operator selected decodable indicia designated as being selected by a predetermined operator input control. In one aspect, apparatus 1000 can be used to allow an operator to select between first and second decodable indicia. Apparatus 1000 can display representations of the first and second indicia simultaneously (if both are in field of view 600 simultaneously) or sequentially (if apparatus 1000 is moved between locations so that the first and second decodable indicia are in a field of view 600 sequentially). In the case where apparatus 1000 is moved between locations it may sequentially decode a plurality of decodable indicia so that a plurality of the decoded massage data, e.g., first decoded message data, second decoded message data, are candidates for output. Candidate decoded message data that is available for selective output can be of decoded message data determined by decoding spatially separated decodable indicia (of a common frame) or sequentially separated decodable indicia (represented in frames captured at different times).

Figure 5:
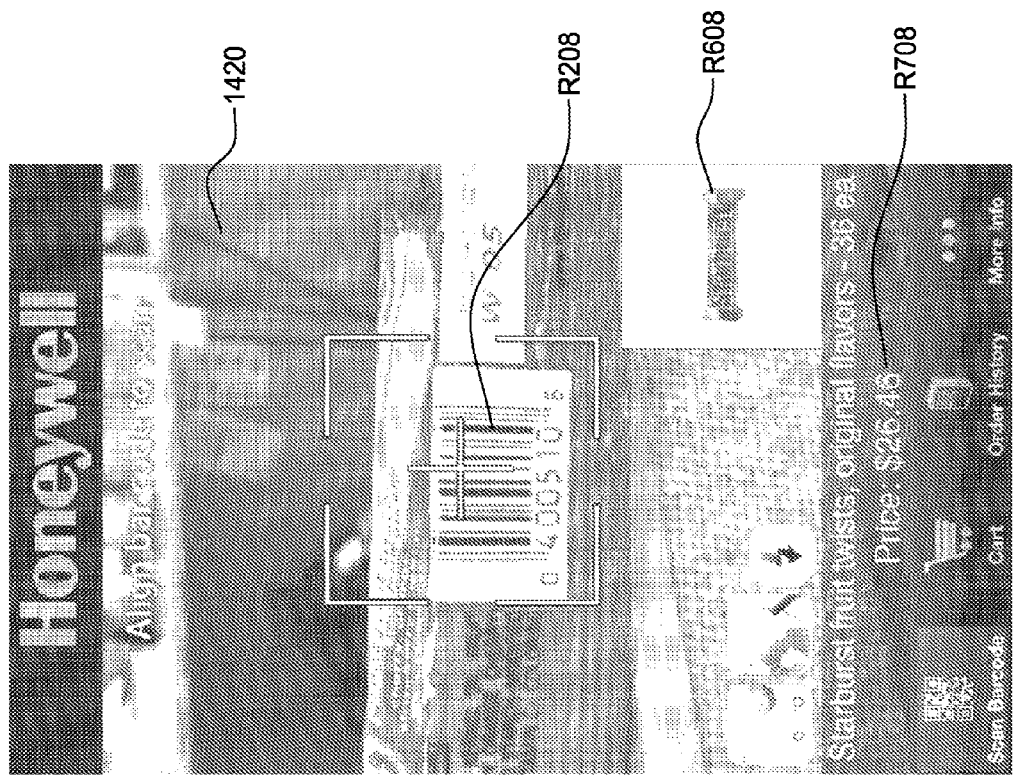
FIGS. 5-7 are examples of screen shots (e.g., which can be displayed by a display of portable hand held or wearable imaging apparatus) displaying image data corresponding to decodable indicia.

For example, as set forth in FIG. 5 display 1420 is shown as displaying a representation R208 corresponding to a single decodable indicia. One or more program 1800 at block 1802 and at block 1804 can provision apparatus 1000 to allow an operator to select or not select the decodable indicia of the single displayed decodable indicia representation R208, thus allowing "filtering", the non-selection" of unwanted decoded message data. An operator may wish to pass over a certain decodable indicia, e.g., if it does not encode the data that is desired to be output to a designated output destination.

One or more program 1800 at block 1802 can display highlights of a decodable indicia. Such highlights are useful in all use cases including where apparatus 1000 is used to allow an operator to select or not select (pass over) decodable indicia of a single decodable indicia representation. For example, where the highlight is a display of a decoded message, the display allows the operator to discern whether the data is the data that the operator wishes to output.

In one aspect one or more program 1800 can message resources in providing a highlight for display on display 1420. The resources can be e.g., one or more database stored locally on apparatus 1000 or externally e.g., on local server (e.g., a store server if in a retail store environment), or a remote server 3000. In one embodiment, the database is a price lookup table. In another embodiment the database is a lookup table correlating product images to decoded messages. One example is the GOOGLE SHOPPER API which on messaging with a decoded message can return a product image. One or more program 1800 at block 1802 can message a resource and in one embodiment can message an external resource, e.g., a database of server 2000 or server 3000. Referring again to FIG. 5, FIG. 5. illustrates a returned product image displayed as a highlight R608. One or more program 1800 also displays a highlight in the form of a displayed price R708. One or more program 1800 at block 1802 can determine price data by messaging a price lookup table stored locally on apparatus 1000 or externally e.g., on server 2000 or server 3000.

After one or more program 1800 determines a data item by messaging an external resource a first time during a running of one or more program 1800 it can store the data item (a price, an image) in a cache memory location of RAM 1080 so that one or more program 1800 can avoid messaging an external resource each time it decodes a message when performing block 1802, thus increasing the display time for displaying the highlight. Also, price lookup tables and image databases can be stored locally on apparatus 1000. It has been mentioned that a displayed highlight can include a decoded message. When a decodable indicia is decoded data other than a decoded message can be provided. Such other information can include, e.g., a time elapsed to decode, location coordinates of the decodable indicia, number of characters, type of decodable indicia, e.g., type of bar code symbology, and other metadata, e.g., metadata that describes a purpose of the data, an internal tracking code or an encoded address. In one embodiments one or more program 1800 at block 1802 one or more item of such other data as a highlight for use in aiding an operator in determining whether the operator would like to select a certain decodable indicia.

In the example shown in FIG. 5 product image highlight R608 is displayed in a location at a designated location of display 1420 in a window which may be spatially separated from a decodable indicia representation.

Figure 6:
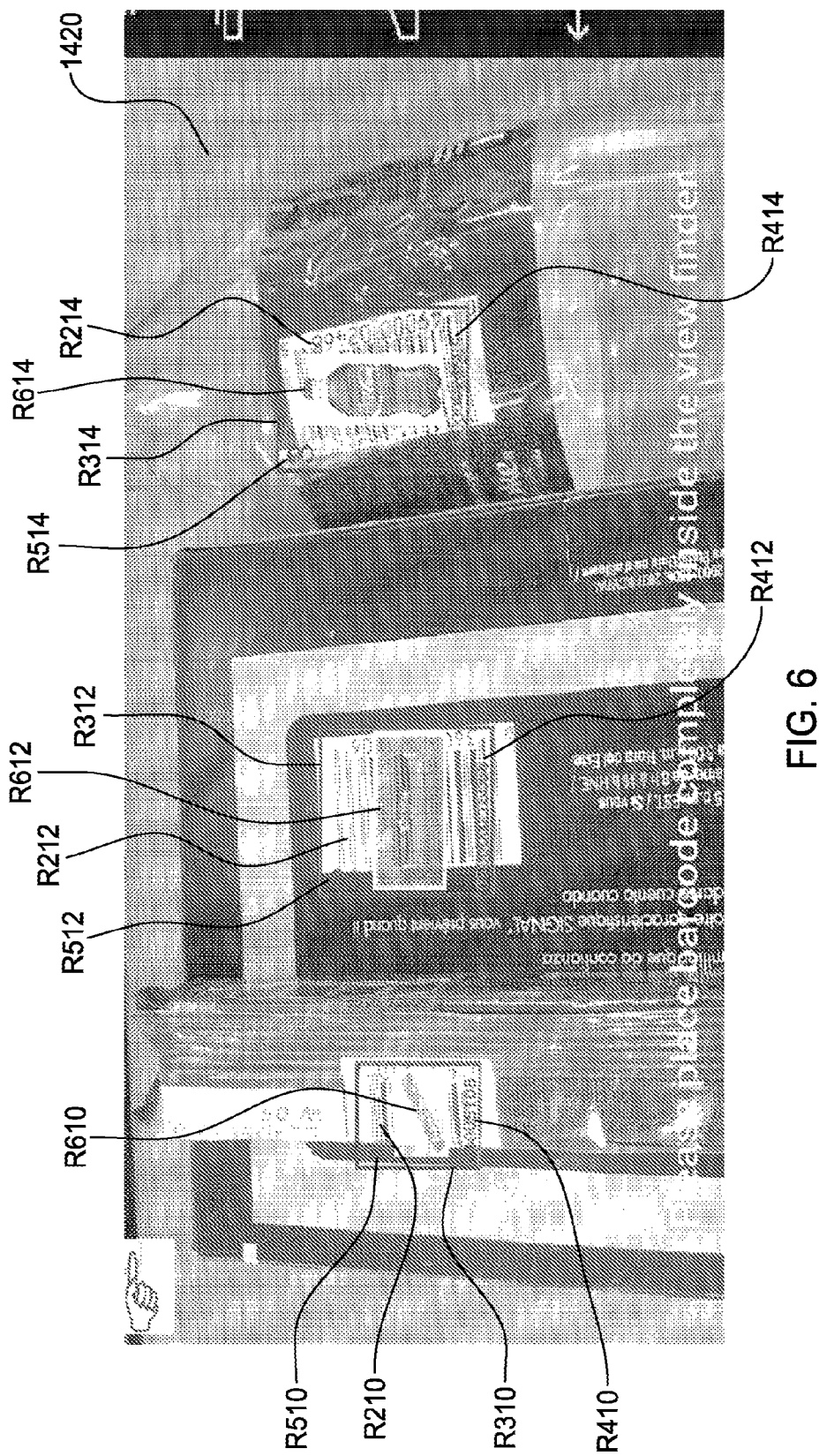

In the example of FIG. 6 one or more program 1800 at block 1802 displays product images at the location of each product image's associated decodable indicia representation. Product image highlight R610 is displayed at a location of decodable indicia representation R210, product image highlight R612 is displayed at a location of decodable indicia representation R212. Product image highlight R614 is displayed at a location of decodable indicia representation R214. One or more program 1800 at block 1802 can display product images displayed as highlights in the example of FIG. 6 can be displayed in semi-transparent form so that a representation of a decodable indicia R210, R212, R214 can be viewed "through" the product image. For display of semitransparent product image one or more program 1800 at block 1802 can display the image in a low resolution. A display of a product image as a highlight of a decodable indicia can aid an operator in determining whether the displayed indicia corresponds to a decodable indicia that the operator wishes to select.

At block 1802 one or more program 1800 can display image data corresponding to a decodable indicia. In one example the image data corresponding to a decodable indicia can comprise a decodable indicia representation. In one example the image data corresponding to a decodable indicia can comprise a decodable indicia representation and one or more associated highlight. In one example the image data corresponding to a decodable indicia can comprise a highlight of a decodable indicia but may be devoid of a representation of the decodable indicia. Referring to the illustrative embodiment as set forth in FIG. 6 the representations of the bar codes (serving as decodable indicia) can be removed and replaced with a display of one or more highlight of each decodable indicia.

Figure 7:
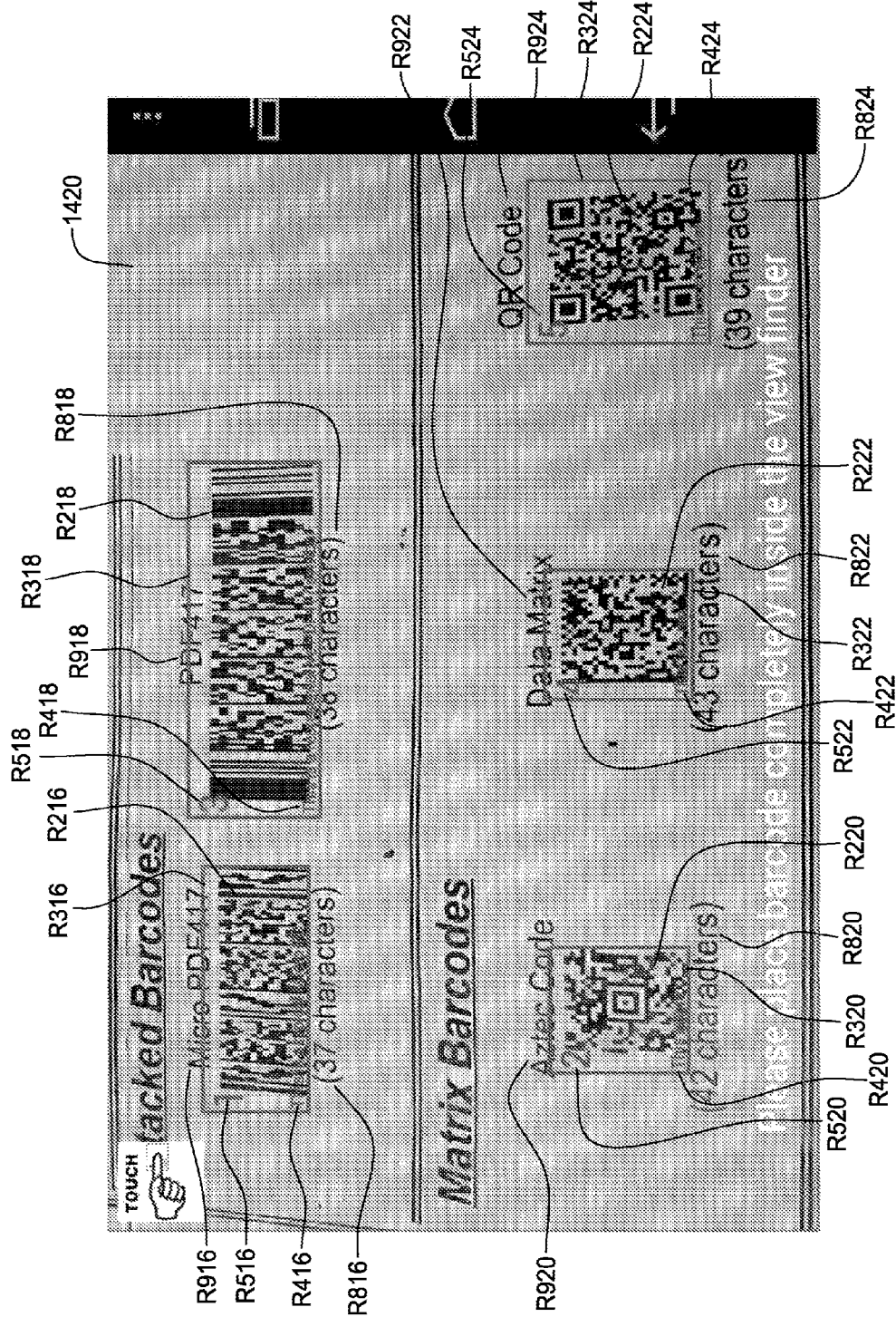

At block 1804 one or more program 1800 can output decoded message data. The decoded message data can include in one example (a) a decoded message. The decoded message data can also include for example (b) other data determined when a decodable indicia is decoded (e.g., elapsed time to decode, coordinate information, number of characters, type of code). For example as shown in FIG. 7, highlights can include text indicating number of characters, e.g., R820 and/or type of decodable indicia R916 (type of bar code symbology in the specific example of FIG. 7). The decoded message data can also include for example (c) data determined by messaging a resource using a decoded message, e.g., a product price, a product image. Decoded message data that is output at block 1804 can include any combination of the (a) (b) and (c) types of data, e.g., can include data of all of the types (a) (b) and (c) or just one or two of the types, e.g., just type (a) just type (b), just type (c).

As has been set forth herein one or more program 1800 at block 1804 can monitor for selection of a decodable indicia by an operator. A monitoring by one or more program 1800 can include, e.g., tactile monitoring (e.g., a touching of display 1420 where provided by a touch screen), acoustical monitoring, (e.g., where an operator inputs a voice command), an image based monitoring, (e.g., one or more program 1800 determines where an operator is looking based on processing of image data captured using an imaging assembly).

In one example of monitoring performed at block 1804, where display 1420 is provided by a touch screen display, one or more program 1800 at block 1804 can cause CPU 1060 to be in communication with display interface 1418 to monitor an input to the display 1420. In one embodiment, one or more program 1800 in the performance of block 1804 can provision apparatus 1000 so that a touching by an operator of a location on a display 1420 that displays a representation of a decodable indicia is determined to be a control to selectively output decoded message data of the displayed decodable indicia.

Accordingly, referring to FIG. 1 a touching of representation R202 results in output of decoded message data of decodable indicia 202 in one embodiment. A touching of representation R204 results in output of a decoded message of decodable indicia 204 in one embodiment. A touching of representation R206 results in output of a decoded message of decodable indicia 206 in one embodiment. One or more program 1800 can be operative so that an operator can select a decodable indicia by touching a displayed highlight rather than a displayed decodable indicia representation (where displayed spatially separately. For example referring to FIG. 5 an operator may touch highlight R608 in order to cause output of decoded message data of the decodable indicia corresponding to decodable indicia representation R208. One or more program 1800 can provision apparatus 1000 so that an operator can select a decodable indicia by touching a displayed highlight of a decodable indicia in addition to or in place of a representation of a decodable indicia. One or more program 1800 can provision apparatus 1000 so that a touch sensitivity of display 1402 is provided with appropriately configured active periods so that, an e.g., an operator who touches an area of a displayed highlight within a timeout period after it ceases to be displayed nevertheless designates a selection of a decodable indicia. One or more program 1800 can in one embodiment provision apparatus 1000 so that an operator can move (e.g. with a pointer controller incorporated on apparatus 1000) a pointer to image data corresponding to a decodable indicia for selection of decodable indicia.

In another example of a monitoring performed at block 1804 one or more program 1800 at block 1804 can cause CPU 1060 to be in communication with a voice recognition module that processes voice data received through audio input interface 1434. A voice recognition module can discriminate various voice messages. In one example such voice recognition module can be provided by DRAGON DICTATION for iOS available from NUANCE COMMUNICATIONS, INC. In one example at block 1804 one or more program 1800 can cause an index to be displayed with the displayed representations of decodable indicia. The displayed indices can be for example number indices "1" "2", "3" as indicated by displayed representations R502, R504, R506 in FIG. 1 and processed voice messages can be messages corresponding to one or more of the displayed indices, e.g., voice messages corresponding to the spoken words "ONE", "TWO" or "THREE". One or more program 1800 can be operative in the referenced example to cause decoded message data of a decodable indicia of representation R202 to be output responsively to an operator saying the word "ONE," to cause decoded message data of the decodable indicia of representation R204 to be output responsively to an operator saying the word "TWO" and to cause decoded message data of the decodable indicia of representation R206 to be output responsively to an operator saying the word "THREE".

In another example of a monitoring performed at block 1804 one or more program can cause CPU 1060 to determine when a certain decodable indicia has been selected based on processed image data captured with use of an imaging assembly. In one example, one or more program 1800 at block 1804 can cause CPU 1060 to determine that a certain decodable indicia has been selected based on processed image data captured by imaging assembly 2400 having upward extending imaging axis 2025. Imaging assembly 2400 can include a field of view that includes an operator. In one embodiment, frames captured using imaging assembly 2400 can be processed for determining eye tracking information, e.g., retinal axes in one embodiment. Software modules that can be employed for determination of eye tracking information include VISIONLAB.NET available from XENTRIX and ISCAN eye tracking software available from Iscan, Inc. In that the relative positions of the displayed locations of representations R202, R204, and R206 and of imaging axis 2025 are known eye tracking and display position information can be processed for determination of which decodable indicia representation, e.g., R202, R204, R206 an operator is currently looking at. The decodable indicia corresponding to the representation that the operator is looking at can be determined to be the selected decodable indicia.

In another embodiment of a monitoring that can be performed at block 1804 one or more program 1800 can be run on an apparatus 1000 that is provided by an eyewear processor equipped apparatus. In such an imaging apparatus display 1420 can be provided by a semi-transparent display mounted on an eyewear frame. In such embodiment, apparatus 100 can include an accelerometer and a gyroscope and can be appropriately configured so that an operator can control a movement of a pointer to a location of image data corresponding to a decodable indicia for selection of a decodable indicia. In such embodiment, an operator can control a movement of a pointer via head movement, or e.g. via voice or via a mechanical pointer controller (e.g., a control pad). An example of an eyewear incorporated processor equipped apparatus is the eyewear based processor equipped apparatus of the GOOGLE GLASS project.

In one aspect the one or more program 1800 provisions apparatus 1000 to restrict to decoded message data of a decodable indicia from being output to an output destination unless an operator inputs an operator control input to apparatus 1000 to output decoded message data of a selected decodable indicia, e.g., the decodable indicia 202, 204, 206 of representations R202, R204, R206 which may be selected by a method set forth herein. In one embodiment apparatus 1000 is configured so that one or more program 1800 so restricts apparatus 1000 from outputting decoded message data other than decoded message data of selected decodable indicia during each possible operating mode of apparatus 1000. In one embodiment apparatus 1000 is configured so that one or more program 1800 so restricts apparatus 1000 from outputting decoded message data other than decoded message data of selected decodable indicia during only select operating modes of apparatus 1000 (and not each possible operating mode).

Regarding highlights that are set forth in the various views, highlights R3XX are displayed borders, highlights R4XX are displayed decoded messages, highlights R5XX are displayed indexes, highlights R6XX are displayed product images, highlight R7XX is a displayed price, highlights R8XX is a displayed character count (number of characters), highlight R9XX is a displayed decodable indicia type. The noted types of highlights can be displayed in any possible combination, e.g., only one of them displayed in association with a decodable indicia, all of them displayed in association with a decodable indicia. In one embodiment a one or more highlight displayed in association with a decodable indicia can be displayed in a certain color e.g., a predetermined color. In one embodiment the certain color is a bright color, e.g., red so at as to increase an attention directing effect. Regarding FIG. 1, highlights R302, R304, and R306 are border highlights, highlights R404, R406, and R408 are decoded message highlights, highlights R502, R504 and R506 are index highlights. Regarding FIG. 5, highlight R608 is a product image highlight and highlight R708 is a price highlight. Regarding FIG. 6, highlights R310, R312, and R314 are border highlights, highlights R410, R412, and R414 are decoded message highlights, highlights R510, R512 and R514 are index highlights. Regarding FIG. 7, highlights R316, R318, R320, R322 and R324 are border highlights, highlights R416, R418, R420, R422 and R424 are decoded message highlights, highlights R516, R518, R520, R522 and R524 are index highlights, highlights R816, R818, R820, R822, and R824 are character count highlights and highlights R916, R918, R920, R922, and R924 are decodable indicia type highlights.

One or more program 1800 can be stored on a non-transitory computer readable storage medium, e.g., memory 1082 or 1084. One or more program 1800 can comprise program code logic, e.g., instructions for execution by a processor for performance of a method set forth herein, e.g., as set forth in connection with FIG. 4. The computer readable medium can be e.g., a semiconductor integrated circuit based memory device, a compact disk, floppy disk, thumb drive, a flash memory device, a hard drive. One or more program 1800 can be stored on a computer readable storage medium provided by one or more memory device of a memory of an external CPU-equipped apparatus (e.g., a server, an external apparatus configured in the manner of apparatus 1000), and downloaded to apparatus 1000. One or more program 1800 can be stored on a computer readable storage medium provided by one or more memory device of a memory 1085 of apparatus 1000. In one embodiment, one or more program 1800 can be stored on a computer readable storage medium that is physically transportable, e.g., compact disk, floppy disk, thumb drive.

There is set forth herein a computer program product for facilitating selective output of decoded message data, the computer program product comprising: a computer readable storage medium readable by a processing circuit and storing instructions for execution by the processing circuit for performing a method comprising: displaying, using a processor, image data corresponding to a decodable indicia in a field of view of an imaging apparatus, and outputting using the processor decoded message data of a selected decoded indicia responsively to an operator input control to output decoded message data of a selected decodable indicia.

A small sample of systems methods and apparatus that are described herein is as follows:

A1. A computer program product comprising: a computer readable storage medium readable by a processing circuit and storing instructions for execution by the processing circuit for performing a method comprising:

displaying, using a processor, image data corresponding to one or more decodable indicia in a field of view of an imaging apparatus, wherein the one or more decodable indicia has been subject to decoding processing at a time of the displaying, and outputting, using the processor, decoded message data of a selected decoded indicia responsively to an operator input control to output decoded message data of a selected decodable indicia of the one or more decodable indicia.

A2. The computer program product of A1, wherein the method further comprises provisioning the imaging apparatus so that the imaging apparatus is restricted from outputting decoded message data of a decodable indicia that has not been designated as a selected decodable indicia by the operator.

A3. The computer program product of A2, wherein the method further comprises provisioning the imaging apparatus so that the imaging apparatus is so restricted from outputting decoded message data of a decodable indicia that has not been designated as a selected decodable indicia by the operator during a select one or more operating mode of the apparatus and is not so restricted from outputting a decoded message of decoded message that has not been designated as a selected decodable indicia by the operator during another one or more operating mode of the apparatus.

A4. The computer program product of A1, wherein the method further comprises monitoring using the processor to determine whether an operator has touched an area of a display to designate a certain decodable indicia as a selected decodable indicia.

A5. The computer program product of A1, wherein the method further comprises monitoring using the processor to determine whether an operator has vocally output a message to designate a certain decodable indicia as a selected decodable indicia.

A6. The computer program product of A1, wherein the method comprises monitoring using the processor using eye tracking information to determine which of a displayed decodable indicia representation the operator is correctly looking at.

A7. The computer program product of A1, wherein the displaying includes displaying representations of decodable indicia that have been determined to be decodable using currently captured image data with one or more highlight.

A8. The computer program product of A7, wherein the one or more highlight includes a border displayed about a representation of a decodable indicia.

A9. The computer program product of A7, wherein the one or more highlight includes a display of text of a decoded message of a decodable indicia.

A10. The computer program product of A7, wherein the one or more highlight is of a certain color.

A11. The computer program product of A7, wherein the one or more highlight includes price lookup information determined by messaging an external database.

A12. The computer program product of A7, wherein the one or more highlight includes a product image obtained by messaging an external database.

A13. The computer program product of A1, wherein the image data corresponding to one or more decodable indicia is devoid of an image representation of the one or more decodable indicia and includes only one or more highlight of the decodable indicia.

A14. The computer program product of A1, wherein the decoded message data includes a decoded message.

A15. The computer program product of A1, wherein the one or more decodable indicia is a plurality of decodable indicia.

A16. The computer program product of A1, wherein the one or more decodable indicia is one decodable indicia.

B1. An imaging apparatus comprising:
a hand held housing;
an imaging assembly having a field of view;
a display;
wherein the imaging apparatus is operative to display on the display image data representing one or more decodable indicia in a field of view of the imaging assembly, wherein the one or more decodable indicia has been subject to decoding processing at a time of the display; and
wherein the imaging apparatus is operative to output decoded message data of a selected decoded indicia responsively to an operator input control to output decoded message data of a selected decodable indicia.

B2. The imaging apparatus of B1, wherein the imaging apparatus is restricted from outputting decoded message data of a decodable indicia that has not been designated as a selected decodable indicia by the operator.

B3. The imaging apparatus of B2, wherein the imaging apparatus is so restricted from outputting decoded message data of a decodable indicia that has not been designated as a selected decodable indicia by the operator during a select one or more operating mode of the apparatus and is not so restricted from outputting a decoded message of decoded message that has not been designated as a selected decodable indicia by the operator during another one or more operating mode of the apparatus.

B4. The imaging apparatus of B1, wherein the imaging apparatus is operative to determine whether an operator has touched an area of the display to designate a certain decodable indicia as a selected decodable indicia.

B5. The imaging apparatus of B1, wherein the imaging apparatus is operative to determine whether an operator has vocally output a message to designate a certain decodable indicia as a selected decodable indicia.

B6. The imaging apparatus of B1, having a second imaging assembly, the second imaging assembly having a field of view defined about an imaging axis that extends upward from hand held housing, wherein the imaging apparatus is operative to determine whether an operator is looking at a certain area of the display to select a certain decodable indicia by processing image data output using the second imaging assembly.

B7. The imaging apparatus of B1, wherein the imaging apparatus is operative to display representations of decodable indicia that have been determined to be decodable using currently captured image data with one or more highlight.

B8. The imaging apparatus of B7, wherein the highlight includes a border displayed about a representation of a decodable indicia.

B9. The imaging apparatus of B7, wherein the highlight includes a display of text of a decoded message of the decodable indicia.

B10. The imaging apparatus of B1, wherein the display is mounted on an eyewear frame.

C1. A computer program product comprising: a computer readable storage medium readable by a processing circuit and storing instructions for execution by the processing circuit for performing a method comprising:

displaying, using a processor, image data corresponding to one or more decodable indicia in a field of view of an imaging apparatus, and outputting, using the processor, decoded message data of a selected decoded indicia responsively to an operator input control to output decoded message data of a selected decodable indicia of the one or more decodable indicia, wherein an operator input control to output decoded message data of a selected decodable indicia comprises a touching of a location of a display that displays a representation of the selected decodable indicia selected by the touching.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A computer program product comprising: a non-transitory computer readable storage medium readable by a processing circuit and storing instructions for execution by the processing circuit for performing a method comprising:
  displaying, using a processor, image data corresponding to one or more decodable indicia in a field of view of an imaging apparatus, wherein the one or more decodable indicia has been subject to decoding processing at a time of the displaying, and each of the decodable indicia that have been decoded is displayed using a flashing display;
  determining, using the processor, that an operator is looking at a certain representation of a decodable indicia from the displayed representations of decodable indicia;
  determining, using the processor, that the decodable indicia corresponding to the certain representation is a selected decodable indicia; and
  outputting, using the processor, decoded message data of the selected decoded indicia responsively to an operator input control to output decoded message data of the selected decodable indicia of the one or more decodable indicia.

2. The computer program product of claim 1, wherein the method further comprises provisioning the imaging apparatus so that the imaging apparatus is restricted from outputting decoded message data of a decodable indicia that has not been designated as a selected decodable indicia by the operator.

3. The computer program product of claim 2, wherein the method further comprises provisioning the imaging apparatus so that the imaging apparatus is so restricted from outputting decoded message data of a decodable indicia that has not been designated as a selected decodable indicia by the operator during a select one or more operating mode of the apparatus and is not so restricted from outputting a decoded message of decoded message that has not been designated as a selected decodable indicia by the operator during another one or more operating mode of the apparatus.

4. The computer program product of claim 1, wherein the method further comprises monitoring using the processor to determine whether an operator has touched an area of a display to designate a certain decodable indicia as a selected decodable indicia.

5. The computer program product of claim 1, wherein the method further comprises monitoring using the processor to determine whether an operator has vocally output a message to designate a certain decodable indicia as a selected decodable indicia.

6. The computer program product of claim 1, wherein the method comprises monitoring using the processor using eye tracking information to determine which of a displayed decodable indicia representation the operator is correctly looking at.

7. The computer program product of claim 1, wherein the displaying image data includes displaying representations of decodable indicia that have been determined to be decodable using currently captured image data with one or more highlight.

8. The computer program product of claim 7, wherein the one or more highlight includes a border displayed about a representation of a decodable indicia.

9. The computer program product of claim 7, wherein the one or more highlight includes a display of text of a decoded message of a decodable indicia.

10. The computer program product of claim 7, wherein the one or more highlight is of a certain color.

11. The computer program product of claim 7, wherein the one or more highlight includes price lookup information determined by messaging an external database.

12. The computer program product of claim 7, wherein the one or more highlight includes a product image obtained by messaging an external database.

13. The computer program product of claim 1, wherein the image data corresponding to one or more decodable indicia is devoid of an image representation of the one or more decodable indicia and includes only one or more highlight of the decodable indicia.

14. The computer program product of claim 1, wherein the decoded message data includes a decoded message.

15. An imaging apparatus comprising:
  a hand held housing;
  an imaging assembly having a field of view;
  a display;
  wherein the imaging apparatus is operative to display on the display image data representing one or more decodable indicia in a field of view of the imaging assembly, wherein the one or more decodable indicia has been subject to decoding processing at a time of the display, and each of the decodable indicia that have been decoded is displayed using a flashing display;

wherein the imaging apparatus is operative to determine that an operator is looking at a certain representation of a decodable indicia from the displayed representations of decodable indicia;

wherein the imaging apparatus is operative to determine that the decodable indicia corresponding to the certain representation is a selected decodable indicia; and wherein the imaging apparatus is operative to output decoded message data of the selected decoded indicia responsively to an operator input control to output decoded message data of the selected decodable indicia.

16. The imaging apparatus of claim 15, wherein the imaging apparatus is restricted from outputting decoded message data of a decodable indicia that has not been designated as a selected decodable indicia by the operator.

17. The imaging apparatus of claim 16, wherein the imaging apparatus is so restricted from outputting decoded message data of a decodable indicia that has not been designated as a selected decodable indicia by the operator during a select one or more operating mode of the apparatus and is not so restricted from outputting a decoded message of decoded message that has not been designated as a selected decodable indicia by the operator during another one or more operating mode of the apparatus.

18. The imaging apparatus of claim 15, having a second imaging assembly, the second imaging assembly having a field of view defined about an imaging axis that extends upward from the hand held housing, wherein the imaging apparatus is operative to determine whether an operator is looking at a certain area of the display to select the certain decodable indicia by processing image data output using the second imaging assembly.

19. A computer program product comprising: a non-transitory computer readable storage medium readable by a processing circuit and storing instructions for execution by the processing circuit for performing a method comprising:

displaying, using a processor, image data corresponding to one or more decodable indicia in a field of view of an imaging display, the image data being displayed as selectable flashing areas representing the one or more decodable indicia;

determining, using the processor, that an operator is looking at the selectable flashing areas having a certain representation of a decodable indicia from the displayed representations of decodable indicia;

determining, using the processor, that the decodable indicia corresponding to the certain representation is a selected decodable indicia; and outputting, using the processor, decoded message data of the selected decodable indicia responsively to an operator input control to output decoded message data of the selected decodable indicia of the one or more decodable indicia.

* * * * *